Oct. 20, 1970 S. STERK 3,534,994
SOD CUTTING TOOL
Filed Aug. 25, 1967
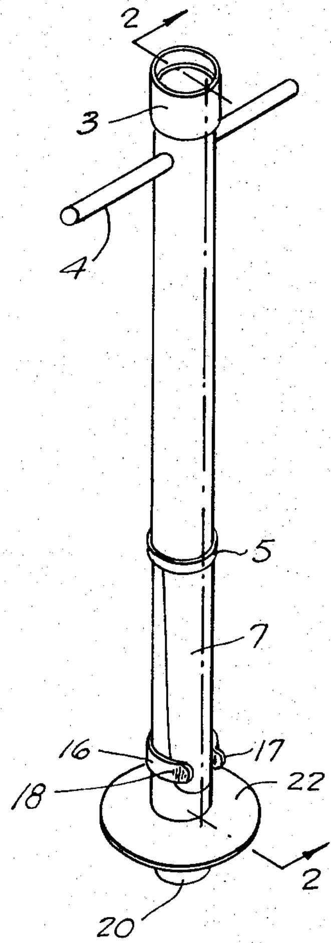
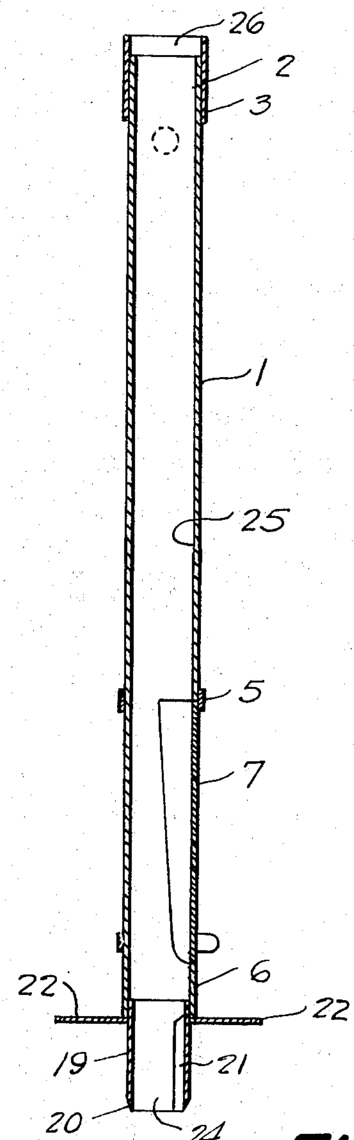
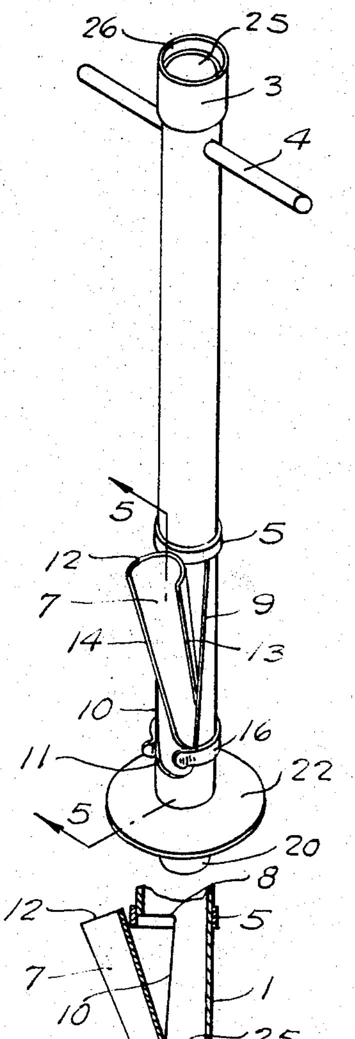
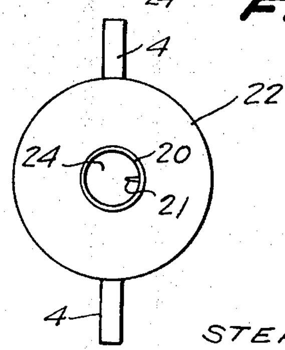
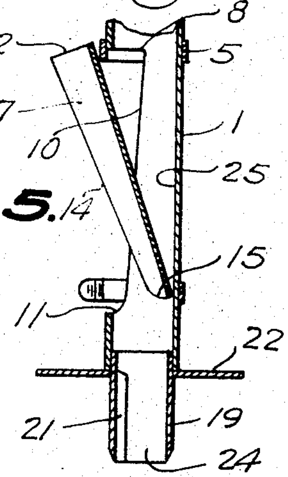
INVENTOR.
STEPHEN STERK,
BY Linton and Linton
ATTORNEYS.

3,534,994

SOD CUTTING TOOL

Stephen Sterk, 3822 Apalachee Parkway, Tallahassee, Fla. 32301

Filed Aug. 25, 1967, Ser. No. 663,270
Int. Cl. A01b *1/16*
U.S. Cl. 294—50.7 5 Claims

ABSTRACT OF THE DISCLOSURE

The present sod cutting tool is for forming ground holes for receiving sod plugs and also for cutting such sod plugs as desired. The tool includes an elongated tubular member having a cutting edge at one end, a foot plate above said cutting edge, a removable section of the tube above the foot plate, a handle at the opposite end and a reinforcing ring on said tube above said handle. Said tube detachable section is retained on the tube when cutting plugs and detachable and reversible for being inserted into the tube through the opening provided by the removal of said section in said tube to guide plug of earth entering the cutting end of the tube when cutting ground holes, through said tube opening.

BACKGROUND OF THE INVENTION

For planting certain types of grasses, such as centipede, St. Augustine, bitter blue, and the like, it is desirable to cut and extract uniform sod plugs of the grass, roots and soil to be transplanted into uniform holes of the same depth and size as said plugs with the least expenditure of time and expense. To start a lawn of such grass a large number of holes to be formed into the ground over the area forming the lawn and a similar number of plugs of the grass have to be cut from an area or field of such grass with each plug to be placed in one of said holes, whereupon the grass will grow and extend over the area to provide a lawn thereof. The present sod cutting tool has been expressly conceived for the purpose of cutting both the sod plugs and the ground holes for such plugs so that the plugs and holes will be of the same configuration.

DESCRIPTION

The object of the present tool is to provide one tool which can cut sod plugs and ground holes, both of the same size with a minimum amount of effort and time and when cutting the ground holes discharge the plugs of earth from the tool to one side of the hole and which tool is rugged and long-lasting.

Furthor objects of the present invention will be in part obvious and in part pointed out in the following detailed description of the accompanying drawing, wherein:

FIG. 1 is a side perspective view of the present tool.

FIG. 2 is a cross-sectional view taken on line 2—2 of FIG. 1.

FIG. 3 is a bottom view of the tool.

FIG. 4 is a side perspective view showing the tool for use in cutting ground holes.

FIG. 5 is a cross-sectional view taken on line 5—5 of FIG. 4.

Referring now more particularly to the accompanying drawing wherein like and corresponding parts are designated by similar reference characters, 1 indicates an elongated light weight tube having an open top end 2.

3 is a band encircling said tube open end for reinforcing the same. A handle 4 extends diametrically on each side of said tube below band 3.

A second band 5 also encircles tube 1. Said tube also has a lower open end 6.

Adjacent to tube end 6 there is provided a detactable section 7 of said tube which when detached from the tube leaves a side opening in said tube defined by a straight tube edge 8, side edges 9 and 10 and bottom edge 11 formed in said tube. Said edges 9 and 10 taper inwardly towards one another from top edge 8 to bottom edge 11. Section 7 which can be cut from tube 1 or formed separately has a straight top edge 12, side edges 13 and 14 and bottom edge 15 with edges 12–15 of said section being capable of being seated on edges 8–11 respectively of said tube for closing said tube opening or said section can be detached and reversed and then extended through the tube opening as shown in FIGS. 4 and 5 for a purpose to be described hereinafter.

Band 5 encircles tube edge 8 and extends therebelow as shown in FIG. 5 so that section top edge 12 can be inserted beneath band 5 as shown in FIG. 2. A resilient band 16 having spaced apart outwardly bent ends 17 and 18 is slideable on tube 1 and capable of encircling section 7 when said section is mated on said tube or slid from said section to permit the detachment thereof.

A second tube 19 has an outside diameter slightly smaller than the interior diameter of tube 1 and has its top end portion inserted within open end 6 of said tube. Said second tube has an annular bottom cutting edge 20, a plate 21 extending radially within the bore 24 of said second tube. An annular plate 22 has a cutter opening through which extends second tube 19 and has upwardly cupped edge 23.

The interior bore 24 of said second tube is slightly smaller than the interior bore 25 of tube 1 which in turn is slightly smaller than the interior bore 26 of band 3.

Preferably the present tool is formed from material such as steel, aluminum or the like and the bands 3 and 5, second tube 19 and plate 22 can be fixedly attached to tube 1 by any suitable means such as welding, bolts, rivets, or the like as may handle 4. Plate 21 is straight and likewise can be welded within the bore 24 to second tube 19 to extend longitudinally thereof or affixed in other conventional manner.

As for an example only of the present tool, tube 1 can be approximately 3 feet long and have an inside diameter of 2½" The second tube bore 24 can be about 2⅛" in diameter while blade 21 is approximately 3/32" thick, ½" wide and 2" long. Annular plate 22 can have a diameter of about 7". However, it is to be appreciated that the tool can be of other measurments as desired.

In the use of the present tube for cutting sod plugs cutting edge 20 is inserted into the grass until plate 22 contacts the top of the ground, and for this purpose the user's foot acn be placed on plate 22 for pressing the tool into the sod. At such time blade 21 bites into the sod plug within tube 19 and holds the sod plug in a stationary position allowing the user to twist handle 4 in a circular motion freeing the plug from the ground. Such action is repeated until a number of plugs (about two dozen) are built up into the tube 1 whereupon the user can invert and easily empty all plugs that are within the tube 1. These plugs move freely because their diameter is smaller than the bore diameter of number 1 tube. The two plugs within the cutting tube should be allowed to remain where they are, until the operator has cut all the plugs he needs on the job. At that time the user can invert the instrument and strike band 3 against a fixed object for dislodging the two plugs retained in the cutting tube.

However, when it is desired to use the tool for cutting ground holes band 16 is slid from section 7 permitting the detachment of said section from tube 1 and the reversing and inserting of said section through tube 1 into bore 25 as shown in FIGS. 4 and 5. That is, the bottom edge 15 of section 7 is inserted first downwardly through opening 8–11 until sides 13 and 14 of section 7 frictionally engage sides 9 and 10, respectively, of tube 1 for holding section 7 as shown in FIG. 5 with the top edge 12 of section 7 above tube edge 8. Due to the inwardly tapering position of the section edges 13 and 14 and tube edges 9 and 10, said section will be frictionally retained in position through the tube.

Thereupon, cutting edge 20 is forced into the ground where the hole is to be provided until plate 22 is seated on the ground and handle 4 turns in a rotary motion so that blade 21 will twist a plug of earth free from the ground and this can be repeated as the plugs of earth will pass through bore 24 to bore 25 until it engages section 7 whereupon the earth plugs spill out of the side of tube 1 allowing continuous digging of such earth plugs.

When it is again desired to cut sod plugs, section 7 is detached, reversed, and seated with its edges 12–15 inclusive on edges 8–10 respectively of tube 1 and band 16 placed over section 7 so that sod plugs can freely move upwardly within bore 25 as they are cut from the sod.

The present invention is capable of considerable modifications and such changes thereto as come within the scope of the appended claims are deemed to be a part thereof.

I claim:

1. A sod cutting tool comprising an elongated tube having opposite open ends and a continuous longitudinal bore throughout the length thereof, a handle connected to the two sides of one end of said tube, a second tube having opposite open ends and a continuous longitudinal bore throughout the length thereof with one end portion extending into said first tube bore at the other end thereof and fixedly connected to said first tube, said second tube having a cutting edge provided at its other end portion exteriorly of said first tube, a blade having an edge fixedly attached to said second tube in the bore thereof and extending radially and longitudinally of said second tube bore, a plate attached to said second tube and extending laterally thereof, said first tube having a side opening, a section of said first tube being detachably mounted in said first tube side opening and when detached capable of insertion through said first tube side opening into and across the bore of said first tube for guiding material passing into said first tube bore outwardly of said first tube side opening.

2. A sod cutting tool as claimed in claim 1, wherein said first tube section has sides extending inwardly towards one another and towards said first tube other end and said first tube side opening is a similar shape to said detachable section for being closed thereby when said section is in one position on said first tube and means for detachably retaining said section in said one positon on sad first tube.

3. A sod cutting tool as claimed in claim 1 wherein said first tube side opening is defined by a top edge in said tube, a bottom edge in said tube and a pair of spaced apart side edges in said tube slanting towards one another from said top edge to said bottom edge and said tube section having a top edge, bottom edge and side edges capable of being seated on said first tube top edge, bottom edge and side edges respectively for closing said first tube opening and detached therefrom and inserted through said first tube opening with said section bottom edge in said first tube bore and said section top edge positioned exteriorly of said first tube.

4. A sod cutting tool as claimed in claim 1 wherein said first tube side opening is defined by edges of said tube provided in the periphery thereof, said first tube section has edges capable of being seated on said first tube opening edges for closing said first tube opening, a band is mounted on said first tube periphery partially extending across said first tube opening for detachably retaining a portion of said section therebeneath and a resilient band having spaced ends is slideably mounted on said first tube periphery and capable of detachably retaining a second portion of said section on said first tube when said section is in its first tube opening closing position.

5. A sod cutting tool as claimed in claim 1 wherein a tubular band encircles and is fixedly attached to said first tube one end and extends therefrom for being bumped against a fixed surface to shake material from said cutting tube bore at said one end thereof, when the total operation is ended.

References Cited

UNITED STATES PATENTS 2,686,690 8/1954 Kushnir ---------- 111—99 X

FOREIGN PATENTS 280,429 11/1927 Great Britain.

ROBERT BAGWILL, Primary Examiner

U.S. Cl. X.R.

172—19